(12) United States Patent
Konrad et al.

(10) Patent No.: US 8,765,319 B2
(45) Date of Patent: Jul. 1, 2014

(54) METHOD AND DEVICE FOR OPERATING A FUEL CELL SYSTEM HAVING A RECIRCULATION BLOWER DISPOSED IN A FUEL CIRCUIT OF THE FUEL CELL SYSTEM

(75) Inventors: Gerhard Konrad, Ulm (DE); Heiner Kunckel, Heroldstadt (DE)

(73) Assignee: Daimler AG, Stuttgart (DE)

( * ) Notice: Subject to any disclaimer, the term of this patent is extended or adjusted under 35 U.S.C. 154(b) by 506 days.

(21) Appl. No.: 12/669,998

(22) PCT Filed: May 28, 2008

(86) PCT No.: PCT/EP2008/004224
§ 371 (c)(1),
(2), (4) Date: Jan. 21, 2010

(87) PCT Pub. No.: WO2009/018867
PCT Pub. Date: Feb. 12, 2009

(65) Prior Publication Data
US 2010/0203365 A1 Aug. 12, 2010

(30) Foreign Application Priority Data
Aug. 7, 2007 (DE) .......................... 10 2007 037 096

(51) Int. Cl.
*H01M 2/00* (2006.01)
(52) U.S. Cl.
USPC .......................................... 429/443; 429/408
(58) Field of Classification Search
USPC .............................. 429/10, 408, 428, 443, 444
See application file for complete search history.

(56) References Cited

U.S. PATENT DOCUMENTS

| | | | | |
|---|---|---|---|---|
| 2004/0091764 A1* | 5/2004 | Hsu et al. | ......................... | 429/34 |
| 2005/0266293 A1 | 12/2005 | Delzanno et al. | | |
| 2007/0190389 A1* | 8/2007 | Hinsenkamp et al. | .......... | 429/34 |
| 2008/0090113 A1* | 4/2008 | Keefer et al. | ................... | 429/17 |
| 2008/0187789 A1* | 8/2008 | Ghezel-Ayagh | ................ | 429/13 |
| 2008/0311454 A1* | 12/2008 | Johnson et al. | ................. | 429/25 |

FOREIGN PATENT DOCUMENTS

| | | | |
|---|---|---|---|
| EP | 1603180 | A | 12/2005 |
| JP | 8203547 | A | 8/1996 |
| JP | 2000231930 | A | 8/2000 |
| JP | 2003031244 | A | 1/2003 |
| JP | 2003109632 | A | 4/2003 |
| JP | 2005259439 | A | 9/2005 |
| JP | 2005347244 | A | 12/2005 |

OTHER PUBLICATIONS

Office Action issued Jul. 8, 2013, in Chinese Patent Application No. 2010-519346 (with English-language translation).

* cited by examiner

Primary Examiner — Mark F Huff
Assistant Examiner — Monique Wills
(74) Attorney, Agent, or Firm — Patent Central LLC; Stephan A. Pendorf

(57) ABSTRACT

The invention relates to a method and a device for operating a fuel cell system (1) having a recirculation blower (11) disposed in a fuel circuit of the fuel cell system (1) by means of which the fuel (BS) exiting the fuel cell system (1) on the anode side is resupplied, said blower being driven by an air-driven drive turbine (12), wherein the air-driven drive turbine (12) is impacted by compressed air (vL).

6 Claims, 1 Drawing Sheet

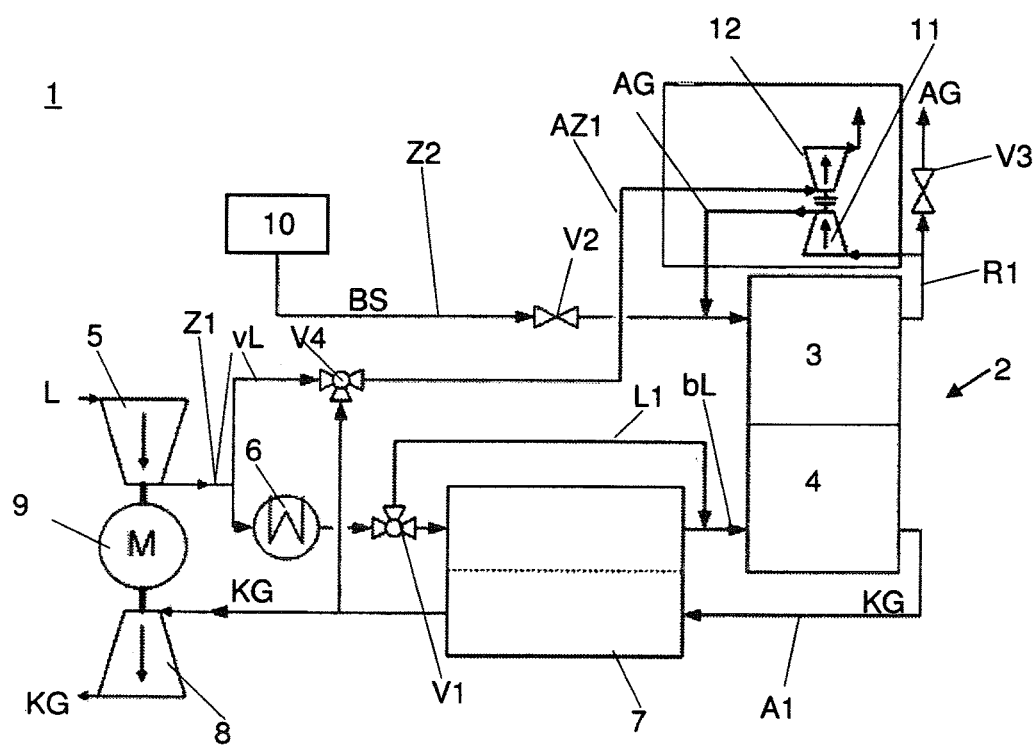

METHOD AND DEVICE FOR OPERATING A FUEL CELL SYSTEM HAVING A RECIRCULATION BLOWER DISPOSED IN A FUEL CIRCUIT OF THE FUEL CELL SYSTEM

The invention relates to a method and a device for operating a fuel cell system having a recirculation blower disposed in a fuel circuit of the fuel cell system.

Usually, with the gas supply for a fuel cell system fresh air as oxidation air is initially compressed in a compressor and then cooled in a charge-air cooler. A lower air mass flow with a relatively high pressure is thereby needed in the region of low electrical performance demands. As the compressor, especially a turbo compressor, can provide the necessary pressure only with higher air mass flows, a higher air mass than needed is usually conveyed in this region, which is blown off as excess air behind the compressor via a relief valve. Furthermore, the air flows into a humidifier module, in which it receives water vapor from a cathode exhaust gas of the fuel cell or a fuel cell stack flowing from the cathode side. The humidified fresh air is then guided into the fuel cell or the fuel cell stack and there takes part in the electrochemical reaction. The cathode exhaust gas flowing out from the cathode side is then guided to the humidifier module, where it passes water vapor to the air guided to the cathode, and is guided to a turbine.

Hyperstoichiometric hydrogen is supplied to the anode of the fuel cell system for example via a dosing valve. Hydrogen which has not converted and nitrogen and water vapor transferred to the cathode are compressed again to the pressure level of the fresh gas by means of a blower (called recirculation blower in the following) and are again fed into the hydrogen inflow.

The recirculation blower is usually driven electromotively for returning the hydrogen. This requires an elaborate power electronics and an additional electric engine.

From JP 2003031244 A is known an air-driven recirculation blower. The recirculation blower is thereby driven by a turbine, which is impacted with cathode exhaust gas, especially air, flowing from the cathode side. It is hereby disadvantageous that, due to the branching of cathode exhaust gas for impacting the turbine, which drives the recirculation blower, the fuel return cannot take place optimally in all load regions.

It is thus the object of the invention to provide a method and a device for operating a fuel cell system with a simple arrangement for operating the recirculation blower with an improved fuel return.

With the method for operating a fuel cell system with a recirculation blower disposed in a fuel circuit of the fuel cell system, by means of which the anode exhaust gas exiting the anode side of the fuel cell system is resupplied, the recirculation blower is driven by an air-driven drive turbine, which is impacted by compressed air. For this, compressed air is preferably branched off at the flow inlet side of the fuel cell system, that is, in front of the cathode inlet. The recirculation blower can hereby be operated optimally over all load regions, that is, with low and high loads. Especially, excessively conveyed air is used energetically hereby in the partial load region of an air supply unit, e.g. of an air compressor of the fuel cell system. The efficiency of the fuel cell system is thus improved.

The drive turbine and the recirculation blower are preferably coupled by means of magnetic force transfer. A magnetic force transfer effects that no connection exists between the drive shaft of the drive turbine and the blower housing, so that the recirculation blower is constructed in a completely housing-tight manner. A mixing of the air as drive medium for the drive turbine and the anode exhaust gas, especially gas containing hydrogen, as conveying medium of the recirculation blower is avoided securely.

The compressed air is taken between the air supply unit and a heat exchanger connected downstream thereof, especially the charge-air cooler. Uncooled compressed air exiting directly from the air supply unit is thus supplied to the drive turbine, so that the drive turbine and the fuel cell system can be operated in all load regions with a sufficiently good efficiency.

Alternatively or additionally, the drive turbine can be impacted with cathode exhaust gas of the fuel cell system exiting on the cathode side. Especially with high loads, only the cathode exhaust gas of the fuel cell system is used as a drive medium for the drive turbine for impacting the drive turbine. For this, a control element, especially a three-way valve, is arranged in front of the drive turbine in a supply line for the drive turbine. Depending on the type of branching of the cathode exhaust gas, it can still be cooled before the impacting.

With regard to the device for operating the fuel cell system with the recirculation blower, which can be coupled to an air-operated drive turbine in a force-fit manner, the air-driven turbine can be impacted with compressed air according to the invention, which can be branched off at the flow input side of the fuel cell. The drive turbine and the recirculation blower can preferably be coupled by means of magnetic force transfer. Elaborate shaft sealings for avoiding a mixing of air as oxidation means and hydrogen as fuel are hereby securely avoided. The compressed air supplied to the drive turbine is thereby conveyed by an air supply unit of the fuel cell system. The air supply unit is especially an air compressor, which is formed as a turbo compressor.

The compressed air can preferably be taken out between the air supply unit and a charge-air cooler connected downstream thereof. Depending on the embodiment, this can be a conventional air-cooled or coolant-cooled charge air cooler.

Cathode exhaust gas of the fuel cell system exiting on the cathode side can be supplied additionally or alternatively to the compressed air for a variable supply of the drive turbine with air. The cathode exhaust gas can furthermore be cooled by means of a heat exchanger prior to the supply. An air-air heat exchanger is thereby used as heat exchanger, especially the humidifier for the compressed air to be supplied to the cathode.

Embodiments of the invention are explained in more detail in the following by means of drawings.

It shows thereby:

FIG. 1 schematically a device for operating a fuel cell system with an indirectly air-driven recirculation blower.

The only FIG. 1 shows a device for operating a fuel cell system 1 with a fuel cell 2. The fuel cell system can alternatively also comprise a fuel cell packet or a fuel cell stack, not shown in a detailed manner. The fuel cell 2 consists of an anode 3 and a cathode 4.

An air supply unit 5, especially an air compressor, a charge-air cooler 6 and a humidifier 7 are connected upstream of the fuel cell 2 on the cathode side for supplying with oxidation means in a cathode supply line Z1. The humidifier 7 can thereby be bypassed via a bypass line (=bypass). For this, a first control element V1 is arranged in the cathode supply line Z1, especially a control valve. The humidifier 7 and an exhaust gas turbine 8 are connected downstream of the cathode 4 via an exhaust gas line Al on the cathode exhaust gas side. The air supply unit 5 and the exhaust gas turbine 8 are engine-driven. A drive engine 9 for driving the air supply unit 5 and of the exhaust gas turbine 8 is provided for this. An accumulator 10 is connected upstream of the fuel cell 2 on the anode side for the supply with fuel BS, especially hydrogen, from which accumulator an anode supply line discharges into the anode 3. The fuel supply can be controlled via a dosing valve V2. A recirculation blower 11 is arranged on the anode exhaust gas side in a return line R1, wherein the return line R1 discharges into the anode supply line Z2 . Furthermore, a relief valve V3 for blowing off anode exhaust gas AG is arranged in the return line R1. The recirculation blower 11 is driven by an air-driven drive turbine 12 according to the present invention. For powering the drive turbine 12 with air, it is open to a branch line AZ1, which is fed with compressed air vL at least from the cathode supply line Z1. Alternatively or additionally, the branch line AZ1 can be fed with cathode exhaust gas KG, especially humid air, by the exhaust gas line A1 of the cathode. For this, a second control element V4 is arranged in the branch line AZ1, especially a control valve, as e.g. a three-way valve.

During the operation of the device, air L, especially fresh air, or another oxygen-containing medium is respectively supplied to the cathode 4 as oxidation means. The air L is thereby conveyed by the air supply unit 5 and compressed. The compressed air vL is subsequently cooled in the charge-air cooler 6 and humidified in the humidifier 7, by taking on water vapor from the cathode exhaust gas KG flowing out on the cathode side and also flowing through the humidifier 7. The humidified air bL flows through the cathode 4 for carrying out the electrochemical reaction—the catalytic reformation—and leaves this as cathode exhaust gas KG, water or water vapor, which is supplied to the humidifier 7 for humidifying the inflowing compressed air vL, and is also discharged therefrom.

Parallel to this, hydrogen or a hydrogen-containing medium is supplied to the anode 3 from the accumulator 10 as fuel BS, which flows as anode exhaust gas AG into the return line R1 on the anode exhaust gas side, and is blown into the anode supply line Z2 via the recirculation blower 11.

For cost reduction by omission of usually used power electronics and used drive engine for the recirculation blower 11 or for the energetic useability of the excessively conveyed air L by means of the air supply unit 5, which is conventionally blown off by means of a relief valve, the drive turbine 12 for the recirculation blower 11 is impacted with compressed air vL of the air supply unit 5. Therewith, the excessively conveyed and compressed air vL in the partial load region can be used. Furthermore, the relief valve known from the state of the art can be omitted. So as to enable a return of anode exhaust gas AG even with high load, the drive turbine 12 is impacted with especially cooled cathode exhaust gas KG. For this, the cathode exhaust gas KG is branched off after the humidifier 7 and supplied to the second control element V4.

So as to avoid a mixing of the medium driving the drive turbine 12—compressed air vL and/or cathode exhaust gas KG—and the medium conveyed by the recircualtion blower 11—hydrogen or hydrogen-containing medium—the drive turbine 12 and the recirculation blower 11 are coupled by means of magnetic force transfer. A drive magnet arranged on a drive shaft of the drive turbine 12, not shown in detail, thereby transfers the force to an impeller magnet of the recirculation blower 11. The impeller, not shown, of the recirculation blower 11, rotates thereby around its own impeller shaft in the blower housing, not shown. Thereby, no connection exists between the drive shaft of the drive turbine 12 and the blower housing, so that no media transfer takes place.

LIST OF REFERENCE NUMERALS

1 Fuel cell system
2 Fuel cell
3 Anode
4 Cathode
5 Air supply unit
6 Charge-air cooler
7 Humidifier
8 Exhaust gas turbine
9 Drive engine
10 Accumulator
11 Recirculation blower
12 Drive turbine
AG Anode exhaust gas
AZ1 Branch line
A1 Exhaust gas line
bL Humidified air
BS Fuel
KG Cathode exhaust gas
L Air
vL Compressed air
V1 First control element
V2 Dosing valve
V3 Relief valve
V4 Second control element
Z1 Cathode supply line
Z2 Anode supply line

The invention claimed is:

1. A method for operating a fuel cell system (1) having a fuel supply line for supplying fuel to the anode side of the fuel cell system (1), an anode exhaust recirculation circuit, a recirculation blower (11) disposed in the anode exhaust gas recirculation circuit of the fuel cell system (1), a drive turbine (12) connected to drive the recirculation blower (11), a motor driven air compressor (5), piping connecting the outlet of the air compressor (5) to the cathode side (4) of the fuel cell system, piping connecting the outlet of the compressor (5) to the drive turbine (12) bypassing the cathode side (4) of the fuel cell system, said method comprising:
 impacting an air-driven drive turbine (12) with compressed air (vL) supplied directly from the motor driven compressor (5) to drive the air-driven drive turbine (12), and
 using the air-driven drive turbine (12) to drive the recirculation blower to resupply the fuel (BS) exiting the fuel cell system (1) downstream of the anode side back into the fuel supply line upstream of the anode side.

2. A method for operating a fuel cell system (1) having a recirculation blower (11) disposed in a fuel circuit of the fuel cell system (1), said method comprising:
 impacting an air-driven drive turbine (12) with compressed air (vL) supplied directly from a source of compressed air to drive the air-driven drive turbine (12), and
 using the air-driven drive turbine (12) to drive the recirculation blower to resupply the fuel (BS) exiting the fuel cell system (1) on the anode side back into the fuel supply line,
 wherein the drive turbine (12) is impacted with compressed air (vL) of an air supply unit (5) of the fuel cell system (1) bypassing the cathode side of the fuel cell .

3. A method for operating a fuel cell system (1) having a fuel supply line for supplying fuel to the anode side of the fuel cell system (1), an anode exhaust recirculation circuit, a recirculation blower (11) disposed in the anode exhaust gas recirculation circuit of the fuel cell system (1), a drive turbine (12) connected to drive the recirculation blower (11), a motor driven air compressor (5), piping connecting the outlet of the air compressor (5) to the cathode side (4) of the fuel cell system, piping connecting the outlet of the compressor (5) to the drive turbine (12) bypassing the cathode side (4) of the fuel cell system, said method comprising:

> impacting an air-driven drive turbine (12) with compressed air (vL) supplied directly from the motor driven compressor (5) to drive the air-driven drive turbine (12), and using the air-driven drive turbine (12) to drive the recirculation blower to resupply the fuel (BS) exiting the fuel cell system (1) downstream of the anode side back into the fuel supply line upstream of the anode side
>
> wherein a charge-air cooler (6) is connected between the air supply unit (5) and the cathode side (4) of the fuel cell system, and wherein the compressed air (vL) is taken out between the air supply unit (5) and a charge-air cooler (6).

4. The method according to claim 1 wherein the drive turbine (12) is additionally impacted with cathode exhaust gas (KG) of the fuel cell system (1) exiting on the cathode side.

5. The method according to claim 4, wherein the cathode exhaust gas (KG) is cooled prior to the impacting of the drive turbine (12).

6. The method according to claim 1, wherein the drive turbine (12) and the recirculation blower (11) are coupled by means of magnetic coupling.

\* \* \* \* \*